US012202049B2

(12) United States Patent
Inoue et al.

(10) Patent No.: US 12,202,049 B2
(45) Date of Patent: Jan. 21, 2025

(54) MACHINE TOOL AND DETECTION METHOD

(71) Applicant: CITIZEN WATCH CO., LTD., Nishitokyo (JP)

(72) Inventors: Atsushi Inoue, Tokorozawa (JP); Masahiro Muramatsu, Nishitokyo (JP); Kenji Noguchi, Sayama (JP); Kohichi Kazahari, Higashikurume (JP)

(73) Assignee: CITIZEN WATCH CO., LTD., Nishitokyo (JP)

( * ) Notice: Subject to any disclaimer, the term of this patent is extended or adjusted under 35 U.S.C. 154(b) by 530 days.

(21) Appl. No.: 17/594,262

(22) PCT Filed: Mar. 30, 2020

(86) PCT No.: PCT/JP2020/014669
§ 371 (c)(1),
(2) Date: Oct. 8, 2021

(87) PCT Pub. No.: WO2020/209134
PCT Pub. Date: Oct. 15, 2020

(65) Prior Publication Data
US 2022/0161333 A1    May 26, 2022

(30) Foreign Application Priority Data

Apr. 11, 2019  (JP) ................. 2019-075849

(51) Int. Cl.
*B23B 25/06* (2006.01)
*B23Q 17/00* (2006.01)
(Continued)

(52) U.S. Cl.
CPC .......... *B23B 25/06* (2013.01); *B23Q 17/002* (2013.01); *B23Q 17/12* (2013.01); *B23B 3/30* (2013.01);
(Continued)

(58) Field of Classification Search
CPC ........ B23Q 17/002; B23Q 17/12; B23B 3/30; B23B 13/04; B23B 25/06; B23B 2260/1285
See application file for complete search history.

(56) References Cited

U.S. PATENT DOCUMENTS

| 4,478,538 A | * | 10/1984 | Kakino | .................. | B23Q 17/12 |
| | | | | | 73/104 |
| 7,234,379 B2 | * | 6/2007 | Claesson | ............ | B23Q 11/0039 |
| | | | | | 82/158 |

(Continued)

FOREIGN PATENT DOCUMENTS

| CH | 651772 A5 * | 10/1985 |
| CN | 204892993 U | 12/2015 |

(Continued)

OTHER PUBLICATIONS

May 27, 2024, Office Action issued by the Korean Intellectual Property Office in the corresponding Korean Patent Application No. 10-2021-7028834.

(Continued)

*Primary Examiner* — Eric A. Gates
(74) *Attorney, Agent, or Firm* — KENJA IP LAW PC (57) ABSTRACT

A machine tool (1) includes: a front spindle (10) having a front chuck (12); a rear spindle (20) having a rear chuck (22); a controller (50) configured to cause the rear chuck (22) to perform a fastening operation for fastening a work (W) fastened to the front chuck (12) to the rear chuck (22); and a detector (60) configured to detect an abnormality caused by the fastening operation by the rear chuck (22), based on measurement data associated with a vibration of at least one of the front chuck (12) and the rear chuck (22).

5 Claims, 4 Drawing Sheets

(51) Int. Cl.
  *B23Q 17/12* (2006.01)
  *B23B 3/30* (2006.01)
  *B23B 13/04* (2006.01)

(52) U.S. Cl.
  CPC ....... *B23B 13/04* (2013.01); *B23B 2260/1285* (2013.01)

(56) References Cited

U.S. PATENT DOCUMENTS

| | | | | |
|---|---|---|---|---|
| 11,440,152 | B2 * | 9/2022 | Uenishi | ................ G05B 19/406 |
| 2020/0114442 | A1 * | 4/2020 | Daniels | ................ B23F 21/226 |
| 2020/0147737 | A1 * | 5/2020 | Nakahama | ......... G05B 23/0227 |

FOREIGN PATENT DOCUMENTS

| | | | | | |
|---|---|---|---|---|---|
| CN | 106181581 | A | | 12/2016 | |
| CN | 108145191 | A | * | 6/2018 | |
| DE | 202006019339 | U1 | * | 5/2008 | ........... B23Q 17/002 |
| JP | S50142593 | U | | 11/1975 | |
| JP | S6334051 | A | | 2/1988 | |
| JP | H03190601 | A | | 8/1991 | |
| JP | H08300240 | A | | 11/1996 | |
| JP | 2005001091 | A | | 1/2005 | |
| JP | 2007326206 | A | | 12/2007 | |
| JP | 2009220242 | A | | 10/2009 | |
| JP | 2017209776 | A | | 11/2017 | |
| JP | 2019030954 | A | | 2/2019 | |
| KR | 101162320 | B1 | * | 7/2012 | |
| KR | 20150071979 | A | * | 6/2015 | |
| KR | 1020160079372 | A | | 7/2016 | |

OTHER PUBLICATIONS

Nov. 14, 2023, Notification of Reasons for Refusal issued by the Japan Patent Office in the corresponding Japanese Patent Application No. 2021-513583.

Dec. 30, 2022, Office Action issued by the Taiwan Intellectual Property Office in the corresponding Taiwanese Patent Application No. 109111887.

May 31, 2023, Office Action issued by the China National Intellectual Property Administration in the corresponding Chinese Patent Application No. 202080019403.4.

Sep. 28, 2021, International Preliminary Report on Patentability issued in the International Patent Application No. PCT/JP2020/014669.

Jun. 16, 2020, International Search Report issued in the International Patent Application No. PCT/JP2020/014669.

* cited by examiner

MACHINE TOOL AND DETECTION METHOD

TECHNICAL FIELD

The present disclosure relates to a machine tool and a detection method.

BACKGROUND

Machine tools such as CNC lathes configured to machine a work using a tool are known (e.g. see PTLs 1 and 2).

CITATION LIST

Patent Literature

PTL 1: JP-A-2007-326206
PTL 2: JP-A-2019-30954

SUMMARY

Technical Problem

Machine tools as described above may include a first spindle having a first chuck and a second spindle having a second chuck. The machine tools may be configured such that the first chuck performs a first fastening operation for fastening a work and then the second chuck performs a second fastening operation for fastening the work, followed by productization for separating the work. In this case, if there is an abnormality such as chip biting or the like in the second fastening operation, an accuracy of machining a product can be compromised.

In view of the above problem, the present disclosure aims to provide a machine tool and a detection method that are capable of effectively detecting an abnormality caused by a fastening operation for fastening a work fastened to the first chuck to the second chuck.

Solution to Problem

A machine tool according to the present disclosure includes a first spindle having a first chuck, a second spindle having a second chuck, a controller configured to cause the second chuck to perform a fastening operation for fastening a work fastened to the first chuck to the second chuck, and a detector configured to detect an abnormality caused by the fastening operation by the second chuck, based on measurement data associated with a vibration of at least one of the first chuck and the second chuck.

In the machine tool according to the present disclosure having the above configuration, preferably, the measurement data include data measured after the second chuck comes into contact with the work due to the fastening operation by the second chuck and before a tool comes into contact with the work subsequent to the fastening operation by the second chuck.

Preferably, the machine tool according to the present disclosure having the above configuration includes a vibration sensor configured to acquire the measurement data.

In the machine tool according to the present disclosure having the above configuration, preferably, the controller is configured to cause the second chuck to perform the fastening operation in a state in which the first spindle and the second spindle are rotated in synchronization with each other and, at least in a case in which the detector does not detect an abnormality, cause continuous machining of the work.

A detection method according to the present disclosure includes a fastening step of causing a second chuck of a second spindle to perform a fastening operation for fastening a work fastened to a first chuck of a first spindle to the second chuck, and a detection step of detecting an abnormality caused by the fastening operation, based on measurement data associated with a vibration of at least one of the first chuck and the second chuck.

The detection method according to the present disclosure having the above configuration includes a machining step of machining the work subsequent to the fastening operation by the second chuck. In the fastening step, preferably, the second chuck is caused to perform the fastening operation in a state in which the first spindle and the second spindle are rotated in synchronization with each other. In the machining step, preferably, at least in a case in which an abnormality is not detected in the detection step, machining of the work is continued.

Advantageous Effect

According to the present disclosure, the machine tool and the detection method that are capable of effectively detecting an abnormality caused by the fastening operation for fastening the work fastened to the first chuck to the second chuck can be provided.

DETAILED DESCRIPTION

Hereinafter, a machine tool and a detection method according to an embodiment of the present disclosure will be described in detail with reference to the drawings.

Figure 1:
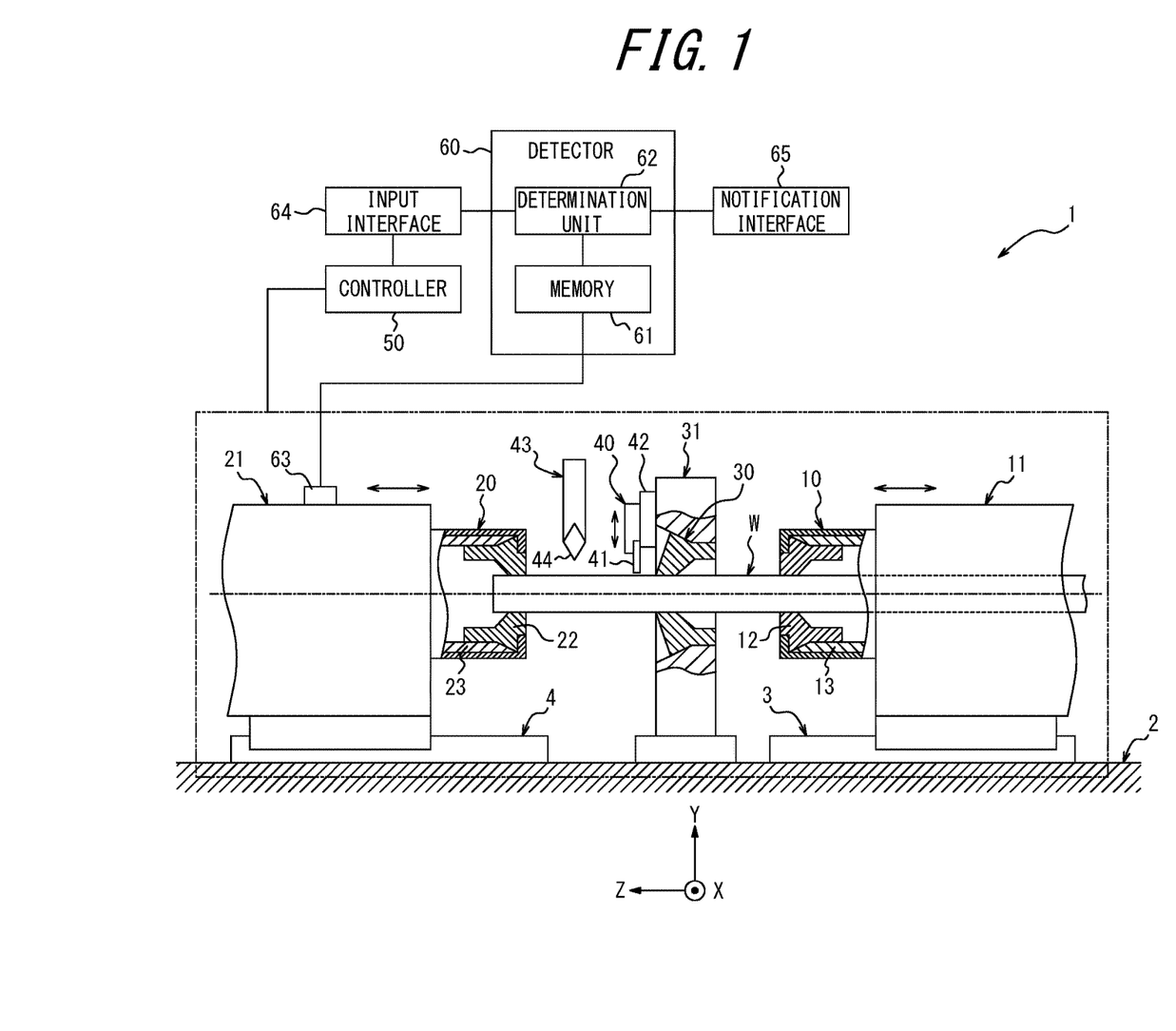
FIG. 1 is a schematic diagram illustrating a machine tool according to an embodiment of the present disclosure.

A machine tool 1 illustrated in FIG. 1 is an automatic lathe (a CNC lathe) configured to machine a long bar material serving as a work (a workpiece) W and includes a front spindle 10 serving as a first spindle and a rear spindle 20 serving as a second spindle.

The front spindle 10 and the rear spindle 20 are arranged opposing each other in a manner such that an axis of the front spindle 10 and an axis of the rear spindle 20 are parallel to each other. Hereinafter, a direction parallel to the axes of the front spindle 10 and the rear spindle 20 will be defined as a Z-axis direction, a direction orthogonal to the Z-axis direction will be defined as an X-axis direction, and a direction orthogonal to the Z-axis direction and the X-axis direction will be defined as a Y-axis direction.

A front spindle base 11 is provided to a base 2 in a manner to be freely moved in the Z-axis direction by a front side moving mechanism 3 such as, for example, a guide rail mechanism. The front spindle 10 is configured to grip the work W while being rotatably supported by the front spindle base 11 and to be driven by a spindle motor to rotate. As the spindle motor, for example, a built-in motor arranged between the front spindle base 11 and the front spindle 10 within the front spindle base 11 can be employed.

A rear spindle base 21 is provided to the base 2 in a manner to be freely moved in the Z-axis direction by a rear side moving mechanism 4 such as, for example, a guide rail mechanism. The rear spindle 20 is configured to grip the work W while being rotatably supported by the rear spindle base 21 and driven by a spindle motor to rotate. As the spindle motor, for example, a built-in motor provided between the rear spindle base 21 and the rear spindle 20 within the rear spindle base 21 can be employed.

Between the base 2 and the front spindle base 11 or between the base 2 and the rear spindle base 21, an X-axis moving mechanism configured to move the front spindle 10 in the X-axis direction relative to the rear spindle 20 is provided. Further, between the base 2 and the front spindle base 11 or between the base 2 and the rear spindle base 21, a Y-axis moving mechanism configured to move the front spindle 10 in the Y-axis direction relative to the rear spindle 20 is provided.

A front chuck 12 serving as a first chuck is provided on a distal side of the front spindle 10 in a manner to be openable and closable. The front chuck 12 is enclosed in a chuck sleeve 13. When the chuck sleeve 13 slides towards the distal side of the front spindle 10, a tapered surface of the front chuck 12 is pressed by a tapered surface of the chuck sleeve 13 and the front chuck 12 is closed. On the other hand, when the chuck sleeve 13 slides towards a proximal side of the front spindle 10, a pressure applied to the tapered surface of the front chuck 12 by the tapered surface of the chuck sleeve 13 is released, and the front chuck 12 is opened. By inserting the work W while the front chuck 12 is opened and then closing the front chuck 12, the work W is fastened to the front chuck 12. The front spindle 10 can grip the work W by fastening the work W to the front chuck 12 in the above manner.

A rear chuck 22 serving as a second chuck is provided on a distal side of the rear spindle 20 in a manner to be openable and closable. The rear chuck 22 is enclosed in a chuck sleeve 23. When the chuck sleeve 23 slides towards the distal side of the rear spindle 20, a tapered surface of the rear chuck 22 is pressed by a tapered surface of the chuck sleeve 23 and the rear chuck 22 is closed. On the other hand, when the chuck sleeve 23 slides towards a proximal side of the rear spindle 20, a pressure applied to the tapered surface of the rear chuck 22 by the tapered surface of the chuck sleeve 23 is released, and the rear chuck 22 is opened. By inserting the work W while the rear chuck 22 is opened and then closing the rear chuck 22, the work W is fastened to the rear chuck 22. The rear spindle 20 can grip the work W by fastening the work W to the rear chuck 22 in the above manner.

Slide driving mechanisms of the chuck sleeves 13 and 23 do not limit the present disclosure but may have various configurations.

A guide bush 30 is provided between the front spindle 10 and the rear spindle 20. The guide bush 30 is mounted on a guide bush support 31 provided on the base 2 and is arranged coaxially with the front spindle 10. By axially adjusting a position of the guide bush 30 relative to the guide bush support 31, an inner diameter of the guide bush 30 is adjusted to correspond to an outer diameter of the work W. The guide bush 30 can guide the work W by freely moving the work W in the Z-axis direction.

The machine tool 1 includes a first machining unit 40. The first machining unit 40 includes a tool 41 configured to machine the work W. The tool 41 is supported by a tool rest 42. On the tool rest 42, the tool 41 is arranged in front of the guide bush 30 and supported by the guide bush support 31 in a manner to be able to freely move in the X-axis direction and the Y-axis direction. A position of the tool rest 42 in the Z-axis direction is fixed. For example, an outer diameter cutting tool, a separating tool, or the like serving as the tool 41 is mounted on the tool rest 42 and can be appropriately switched over therebetween by moving the tool rest 42 in, for example, the X-axis direction, according to machining details.

The machine tool 1 also includes a second machining unit 43. The second machining unit 43 includes a tool 44 configured to machine a rear side of the work W. The tool 44 is supported by a tool rest (not illustrated). The tool rest is supported by the base 2 in a manner to be able to freely move in, for example, the X-axis direction and the Y-axis direction. For example, an outer diameter cutting tool, a separating tool, or the like serving as the tool 44 is mounted on the tool rest and can be appropriately switched over therebetween by moving the tool rest 42 in, for example, the X-axis direction, according to the machining details.

The machine tool 1 includes a controller 50. The controller 50 may be configured using, for example, a microcomputer equipped with a CPU (a central machining unit), a memory (a storage device), and the like. The controller 50 can integrally control respective operations by the front spindle 10 (including the front spindle base 11 and the front chuck 12), the rear spindle 20 (including the rear spindle base 21 and the rear chuck 22), the first machining unit 40, and the second machining unit 43.

Here, the controller 50 has a function to cause the front spindle 10, the rear spindle 20, the first machining unit 40, and the second machining unit 43 to operate such that the first machining unit 40 and the second machining unit 43 continuously perform predetermined machining and separating machining on the work W gripped by the front chuck 12 and/or the rear chuck 22, to obtain a plurality of products.

In particular, the controller 50 has a function to cause the first machining unit 40 to perform a predetermined machining on the work W fastened to the front chuck 12 and, as illustrated in FIG. 1, cause the rear chuck 22 to fasten the work W fastened to the front chuck 12 to the rear chuck 22 and then, in this state, cause the first machining unit 40 to perform the separating machining on the work W. That is, the controller 50 is configured to cause the rear chuck 22 to perform a fastening operation for fastening the work W fastened to the front chuck 12 to the rear chuck 22. Here, during the fastening operation by the rear chuck 22, the controller 50 synchronizes a rotation speed of the rear spindle 20 with a rotation speed of the front spindle 10 in a state in which the work W is rotated by the front spindle 10 and causes a front end of the work W to be inserted into the rear chuck 22 so as to fasten the work W to the rear chuck 22 in a state in which the rotation speeds are synchronized with each other as described above. That is, the controller 50 is configured to cause the rear chuck 22 to perform the fastening operation in the state in which the front spindle 10 and the rear spindle 20 are rotated in synchronization with each other.

Further, the controller 50 has a function to cause the first machining unit 40 to perform the separating machining on the work W fastened to the front chuck 12 and the rear chuck 22 and then cause the second machining unit 43 to perform additional machining on the work W fastened to the rear chuck 22 so as to obtain the work W as a product. Note that the controller 50 may have a function to obtain the work W subjected to the separating machining as a product without causing the second machining unit 43 to perform the additional machining. Further, the machine tool 1 may have a configuration omitting the second machining unit 43.

In a case in which there is an abnormality such as chip biting or the like during the fastening operation by the rear chuck 22 as described above, an accuracy in the separating machining or additional machining may be adversely affected, possibly compromising an accuracy of machining the product. Thus, the machine tool 1 according to the present embodiment includes a detector 60 configured to detect an abnormality caused by the fastening operation by the rear chuck 22, based on measurement data associated with a vibration of the rear chuck 22.

The detector 60 includes a memory 61 configured to store the measurement data associated with the vibration of the rear chuck 22, and a determination unit 62 configured to determine the presence or absence of an abnormality caused by the fastening operation by the rear chuck 22, based on the measurement data stored in the memory 61. The machine tool 1 further includes a vibration sensor 63 configured to acquire the measurement data associated with the vibration of the rear chuck 22, an input interface 64 used for setting a determination criterion of the determination unit 62, and a notification interface 65 configured to notify a determination result by the determination unit 62.

The detector 60 can be configured using a microcomputer that constitutes the controller 50. The detector 60 is not limited thereto and may be configured using, for example, an additional microcomputer that includes a CPU, a memory, and the like and is different from the microcomputer constituting the controller 50.

The memory 61 can be configured using, for example, a memory. The memory 61 is configured to store the measurement data associated with the vibration of the rear chuck 22 acquired by the vibration sensor 63, that is, a rotational vibration of the rear spindle 20. Although the vibration sensor 63 is arranged on the rear spindle base 21 configured to support the rear spindle 20, this is not restrictive. The vibration sensor 63 may be arranged on, for example, the rear spindle 20. The vibration sensor 63 may be any sensor capable of detecting the rotational vibration of the rear spindle 20 and may be, for example, an acceleration sensor, an AE sensor, a displacement meter, a microphone, or the like. Although the measurement data associated with the rotational vibration of the rear spindle 20 is acquired by the vibration sensor 63 in the present embodiment, this is not restrictive. The measurement data may be acquired by measuring, for example, a load (a current value or a voltage value) of the spindle motor that drives the rear spindle 20 to rotate. That is, the memory 61 is not limited to be configured to store the measurement data acquired by the vibration sensor 63 and may be configured to store the measurement data acquired by, for example, measuring the load of the spindle motor.

Figure 2:
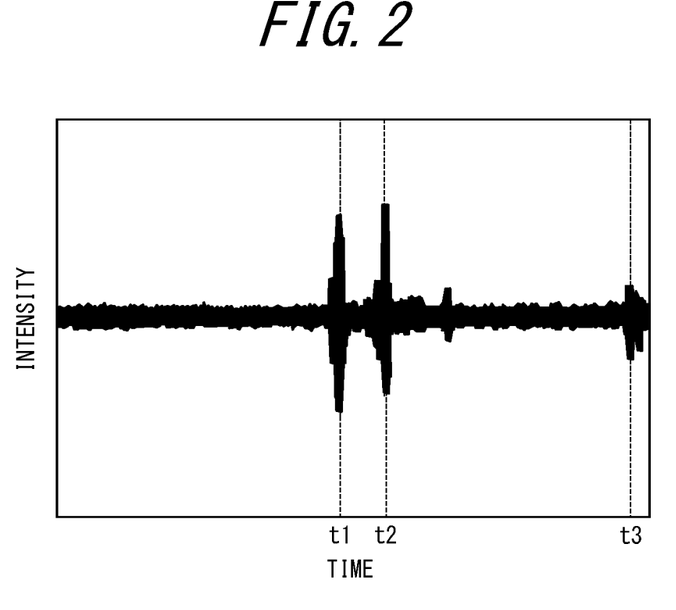
FIG. 2 is a diagram illustrating an example of measurement data associated with a vibration of a second chuck in a case in which there is not an abnormality caused by a fastening operation by the second chuck.
Figure 3:
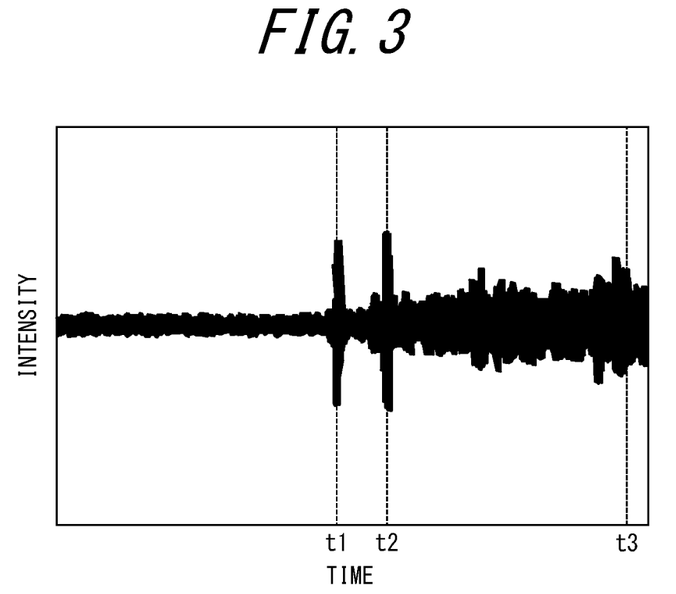
FIG. 3 is a diagram illustrating an example of the measurement data associated with the vibration of the second chuck in a case in which there is an abnormality caused by the fastening operation by the second chuck.

Here, the measurement data associated with the vibration of the rear chuck 22 include data measured after the rear chuck 22 comes into contact with the work W due to the fastening operation by the rear chuck 22 and before the tool 41 comes into contact with the work W subsequent to the fastening operation by the rear chuck 22 (hereinafter, also referred to as a specific period). The measurement data may be constantly measured. Examples of such measurement data are illustrated in FIG. 2 to FIG. 3. FIG. 2 illustrates measurement data in a case in which there is not an abnormality caused by chip biting between the rear chuck 22 and the work W, and FIG. 3 illustrates measurement data in a case in which there is an abnormality caused by chip biting between the rear chuck 22 and the work W.

In FIG. 2, a time t1 is a time at which a sliding movement of the chuck sleeve 23 is started for the fastening operation by the rear chuck 22. At the time t1, a peak of a vibration intensity is measured due to a vibration generated by the start of the sliding movement of the chuck sleeve 23. A time t2 is a time at which the rear chuck 22 is fastened (i.e., a time at which the rear chuck 22 comes into contact with the work W due to the fastening operation by the rear chuck 22). At the time t2, a peak of the vibration intensity is measured due to a vibration generated by the fastening operation by the rear chuck 22. A time t3 is a time at which the tool 41 starts the separating machining on the work W subsequent to the fastening operation by the rear chuck 22 (i.e., a time at which the tool 41 comes into contact with the work W subsequent to the fastening operation by the rear chuck 22). At the time t3, a peak of the vibration intensity is measured due to a vibration generated by the separating machining. FIG. 3 also illustrates the times t1 to t3 corresponding to those of FIG. 2. In FIG. 3, due to the abnormality caused by chip biting, the intensity in a portion after the time t2 and before the time t3 is increased as compared with that illustrated in FIG. 2. Thus, determining the presence/absence of an increase in the intensity as described above enables determination of the presence/absence of an abnormality caused by the fastening operation by the rear chuck 22.

The criterion for determining whether the intensity of the portion (the measurement data measured in the specific period) after the time t2 and before the time t3 is increased may be based on, for example, Fast Fourier Transform (FFT) processing, a statistical method, machine learning, or other methods. The criterion based on the Fast Fourier Transform (FFT) processing may include a step of calculating a predetermined index value based on an intensity of a predetermined frequency or a frequency band in frequency domain data acquired by performing the FFT processing on the measurement data in a time domain and comparing a calculated index value with a threshold value. The criterion based on the statistical method may include, for example, a step of extracting a predetermined amount of intensity data from the measurement data, calculating an index value based on a mean value and a standard deviation (or a variance) of the intensity data, and comparing the calculated index value with a threshold value. The criterion based on machine learning may be constructed by, for example, deep learning or the like. In using any one of the methods, the criterion may use model data of an abnormal group and a normal group that have been read in advance at the time of shipment of the machine tool 1 and/or that are read as appropriate. Alternatively or additionally, past measurement data acquired at the time of machining of the machine tool 1 may be used.

Figure 4:
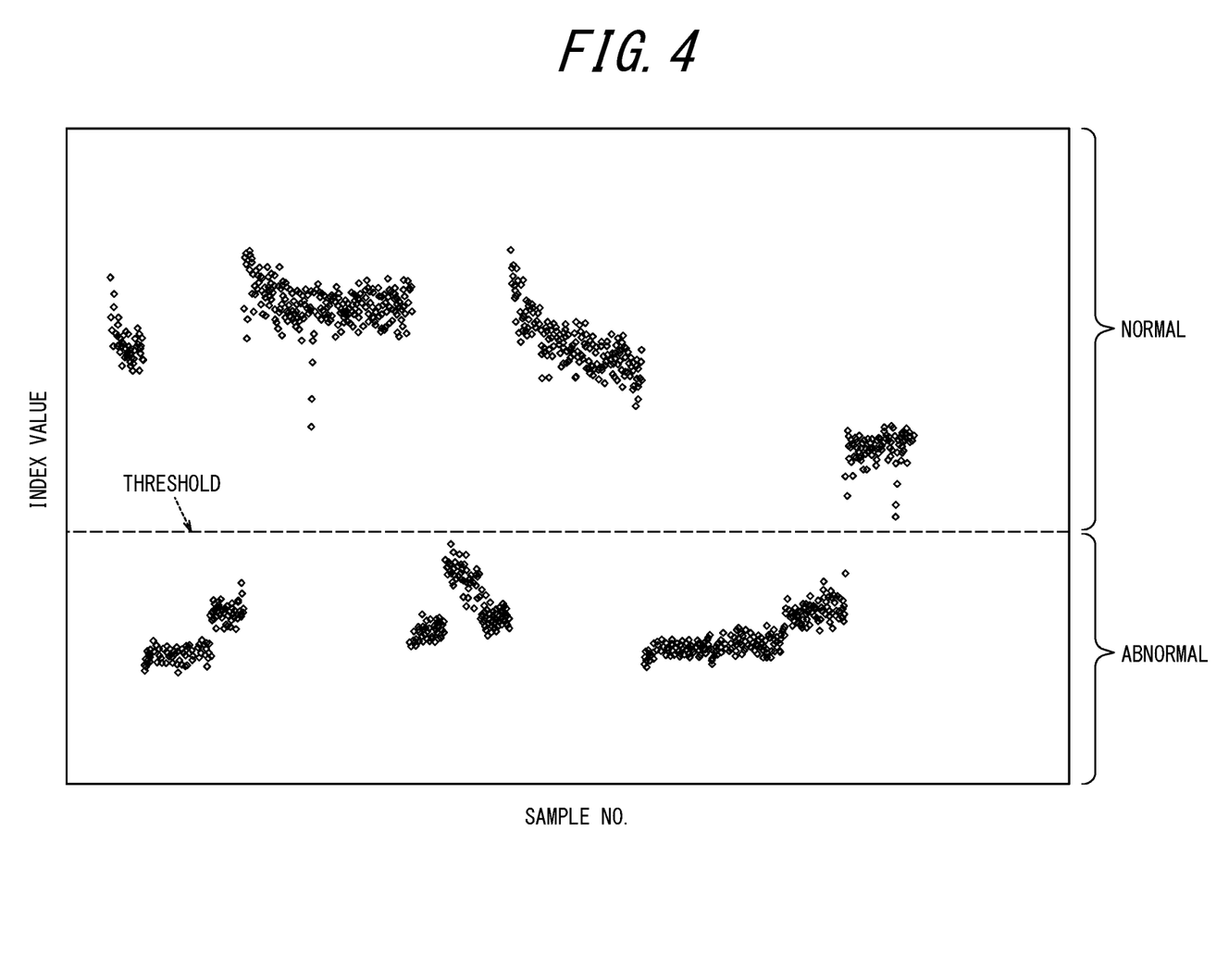
FIG. 4 is a diagram illustrating example distributions of an index value of a case in which there is an abnormality caused by the fastening operation by the second chuck and an index value of a case in which there is not an abnormality caused by the fastening operation.

FIG. 4 illustrates examples of determination results regarding whether the intensity of the portion after the time t2 and before the time t3 increases, using the determination criterion based on the statistical method. In this determination, the predetermined amount of intensity data was extracted from the measurement data, and then the index value was calculated based on the mean value and the standard deviation. Subsequently, the calculated index value was compared with the threshold value. It can be seen from the results illustrated in FIG. 4 that an abnormality caused by the fastening operation by the rear chuck 22 can be accurately detected based on the measurement data of the portion after the time t2 and before the time t3.

Thus, preferably, the determination unit 62 determines whether there is an abnormality caused by the fastening operation by the rear chuck 22, based on the measurement data measured in the specific period. Further, the determination by the determination unit 62 is performed during the specific period. A start time of the specific period, i.e., the time at which the rear chuck 22 comes into contact with the work W due to the fastening operation by the rear chuck 22 may be calculated from the time at which the rear chuck 22 starts the fastening operation or may be calculated using other methods. An end time of the specific period, i.e., the time at which the tool 41 comes into contact with the work W subsequent to the fastening operation by the rear chuck 22 may be calculated from a time at which the machine tool 1 starts machining or may be calculated using other methods.

The input interface 64 is configured to receive input regarding the determination criterion of the determination unit 62, a machining condition of the work W, and the like. The input interface 64 may be configured using, for example, a button, a keyboard, a touch panel, or the like. Note that the determination criterion of the determination unit 62 may be automatically created without using the input interface 64.

The notification interface 65 is configured to notify the presence or absence of an abnormality caused by the fastening operation by the rear chuck 22 determined by the determination unit 62, by generating, for example, an indication or a sound. The notification interface 65 can be configured using, for example, a display, a warning light, a speaker, or the like.

The determination regarding the presence or absence of an abnormality caused by the fastening operation by the rear chuck 22 is performed in a state in which the controller 50 causes the front spindle 10 and the rear spindle 20 to be rotated in synchronization with each other. In a case in which the detector 60 does not detect an abnormality caused by the fastening operation by the rear chuck 22, the controller 50 is configured to cause the first machining unit 40 to continuously perform the separating machining on the work W, i.e., without stopping the rotations of the front spindle 10 and the rear spindle 20. That is, the controller 50 is configured to cause continuous machining of the work W at least in a case in which the detector 60 does not detect an abnormality caused by the fastening operation by the rear chuck 22.

Further, in a case in which the detector 60 detects an abnormality caused by the fastening operation by the rear chuck 22, the controller 50 has a function to change the machining condition of the work W (i.e., reducing a cutting speed, etc.) and then cause continuous machining of the work W. In a case in which the detector 60 detects an abnormality caused by the fastening operation by the rear chuck 22, the controller 50 may have a function to suspend the machining on the work W until the abnormality is resolved.

The determination unit 62 may be configured to, in addition to determining whether there is an abnormality caused by the fastening operation by the rear chuck 22, determine a mode of the abnormality caused by the fastening operation by the rear chuck 22 (i.e., locating a position of the chip biting, determining whether the abnormality is caused by chip biting or another reason, etc.).

The detection method according to the embodiment of the present disclosure can be performed using the machine tool 1 as described above. The detection method according to the present embodiment is also applicable when another machine tool is used.

Figure 5:
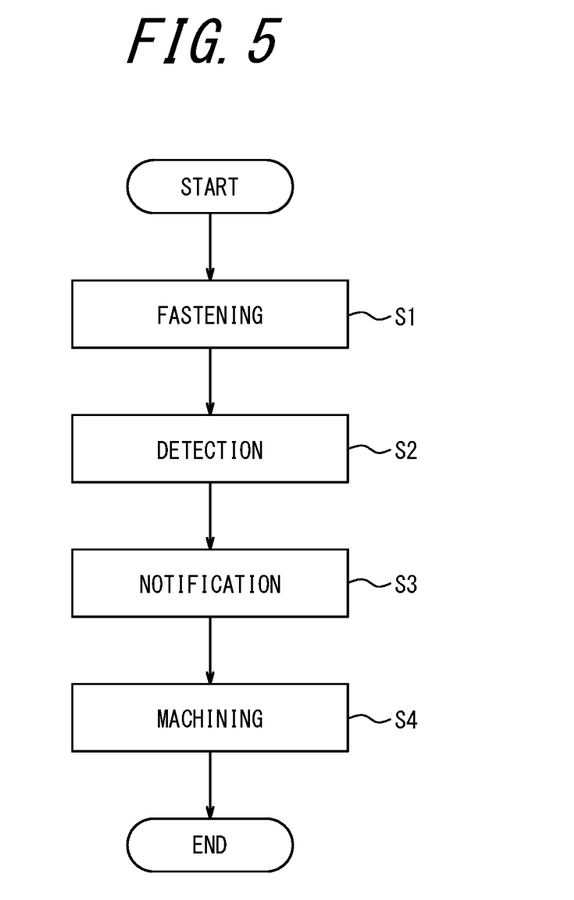
FIG. 5 is a flowchart illustrating a detection method according to an embodiment of the present disclosure.

The detection method according to the present embodiment includes a fastening step S1, a detection step S2, a notification step S3, and a machining step S4, as illustrated in FIG. 5. The fastening step S1 is a step of causing the rear chuck 22 of the rear spindle 20 to perform the fastening operation for fastening the work W fastened to the front chuck 12 of the front spindle 10 to the rear chuck 22. The detection step S2 is a step of detecting an abnormality caused by the fastening operation by the rear chuck 22, based on the measurement data associated with the vibration of the rear chuck 22. The notification step S3 is a step of notifying the presence or absence of an abnormality detected in the detection step S2. The machining step S4 is a step of machining the work W using the tool 41 subsequent to the fastening operation by the rear chuck 22.

In the fastening step S1, the controller 50 causes the rear chuck 22 to perform the fastening operation in the state in which the front spindle 10 and the rear spindle 20 are rotated in synchronization.

When the rear chuck 22 performs the fastening operation in the fastening step S1, the detection step S2 is started. In the detection step S2, the determination unit 62 determines whether there is an abnormality caused by the fastening operation by the rear chuck 22, based on the measurement data in the specific period from the measurement data stored in the memory 61. This determination is performed in the state in which the controller 50 causes the front spindle 10 and the rear spindle 20 to be rotated in synchronization with each other.

When the detection step S2 is completed, the notification step S3 is started. In the notification step S3, the notification interface 65 notifies the presence or absence of an abnormality detected in the detection step S2. Note that the notification step S3 may be configured to notify only when an abnormality is detected in the detection step S2. Notifying the abnormality can prompt an appropriate respond from a user.

When the notification step S3 is completed, the machining step S4 is started. In the machining step S4, the controller 50 causes the tool 41 to perform the separating machining on the work W. The controller 50 also causes the tool 44 to perform additional machining on the work W, as necessary, to obtain the work W as a product. In a case in which an abnormality is not detected in the detection step S2, the controller 50 causes the separating machining on the work W to be performed continuously, i.e., without stopping the rotation of the front spindle 10 and the rear spindle 20. In a case in which an abnormality is detected in the detection step S2, the controller 50 changes the machining condition of the work W or the like in response and then causes the separating machining on the work W to be performed continuously. In a case in which an abnormality is detected in the detection step S2, the machining of the work W may be suspended in the machining step S4 until the abnormality is resolved.

It is needless to say that the present disclosure is not limited to the embodiments described above and can be variously modified without departing from the gist thereof.

For example, although the machine tool 1 includes the guide bush 30 in the above embodiments, the machine tool 1 can omit the guide bush 30.

Further, although an abnormality caused by the fastening operation by the rear chuck 22 is detected based on the measurement data associated with the vibration of the rear chuck 22 in the above embodiments, measurement data associated with the vibration of the front chuck 12 may be used instead of, or in addition to, the measurement data associated with the vibration of the rear chuck 22.

REFERENCE SIGNS LIST

1 machine tool
2 base
3 front side moving mechanism
4 rear side moving mechanism
10 front spindle (first spindle)
11 front spindle base
12 front chuck (first chuck)
13 chuck sleeve
20 rear spindle (second spindle)
21 rear spindle base
22 rear chuck (second chuck)
23 chuck sleeve
30 guide bush
31 guide bush support
40 first machining unit
41 tool
42 tool rest
43 second machining unit
44 tool
50 controller
60 detector
61 memory
62 determination unit
63 vibration sensor
64 input interface
65 notification interface
W work

The invention claimed is:

1. A machine tool comprising:
 a first spindle having a first chuck;
 a second spindle having a second chuck;
 a controller configured to cause the second chuck to perform a fastening operation for fastening a work fastened to the first chuck to the second chuck; and
 a detector configured to detect an abnormality caused by the fastening operation by the second chuck, based on measurement data associated with a vibration of at least one of the first chuck and the second chuck.

2. The machine tool according to claim 1,
 wherein the measurement data include data measured after the second chuck comes into contact with the work due to the fastening operation by the second chuck and before a tool comes into contact with the work subsequent to the fastening operation by the second chuck.

3. The machine tool according to claim 1,
 comprising a vibration sensor configured to acquire the measurement data.

4. The machine tool according to claim 1,
 wherein the controller is configured to cause the second chuck to perform the fastening operation in a state in which the first spindle and the second spindle are rotated in synchronization with each other and, at least in a case in which the detector does not detect an abnormality, cause continuous machining of the work.

5. The machine tool according to claim 1,
 wherein the detector determines the presence/absence of an abnormality based on the presence/absence of an increase in intensity of the vibration compared to a case in which there is not an abnormality.

* * * * *